United States Patent [19]

Yasumoto et al.

[11] Patent Number: 4,985,769
[45] Date of Patent: Jan. 15, 1991

[54] MULTIPLEX TV SIGNAL PROCESSING APPARATUS

[75] Inventors: Yoshio Yasumoto, Nara; Sadashi Kageyama, Hirakata; Shuji Inoue, Neyagawa; Yoshio Abe, Ibaraki; Hideyo Uwabata, Neyagawa, all of Japan

[73] Assignee: Matsushita Electric Industrial Co., Ltd., Osaka, Japan

[21] Appl. No.: 174,452

[22] Filed: Mar. 23, 1988

[51] Int. Cl.$^5$ .................................................. H04N 7/04
[52] U.S. Cl. ...................................... 358/141; 358/142; 358/12
[58] Field of Search ........................ 358/12, 14, 15, 16, 358/141, 142

[56] References Cited

U.S. PATENT DOCUMENTS 4,581,640  4/1986  Cole .................................... 358/141

FOREIGN PATENT DOCUMENTS 0120386  7/1983  Japan .
1198986  7/1970  United Kingdom .................. 358/14

Primary Examiner—James J. Groody
Assistant Examiner—David E. Harvey
Attorney, Agent, or Firm—Wenderoth, Lind & Ponack

[57] ABSTRACT

Disclosed are multiplex television signal processing apparatuses in a television signal transmitting and receiving system. An apparatus at the transmitting side comprises: a signal separator to separate a multiplex signal into a first and a second part; a time-multiplexer to time-multiplex a main television signal and the first part of the multiplex signal to obtain a time-multiplexed main signal; a first amplitude-modulator for modulating a first carrier by the multiplexed main signal to obtain a vestigial side band signal, amplitude-modulated main signal; a second amplitude-modulator for modulating a second carrier which is same in frequency as but different in phase by 90 degrees from the first carrier by a second multiplex signal; an inverse Nyquist filter for filtering this signal to obtain a vestigial side band, amplitude-modulated multiplex signal; and an adder for adding the vestigial side band, amplitude-modulated main and multiplex signals to obtain a multiplexed signal.

An apparatus at the receiving side comprises: a Nyquist filter for filtering the multiplexed signal; a carrier regenerator for regenerating the first and second carriers from the multiplexed signal; a main signal detector for detecting the main signal from the multiplexed signal passed through the Nyquist filter by using the first carrier; a filter for removing quadrature distortion from the multiplexed signal; a multiplex signal detector for detecting the first multiplex signal from the multiplexed signal passed through the filter by using the second carrier; a time-demultiplexer to time-demultiplexing the main signal into a main television signal and a second multiplex signal; and a signal composer for composing the first and second multiplex signal to obtain the original multiplex signal.

17 Claims, 18 Drawing Sheets

P1 --- VIDEO CARRIER
C --- COLOR SUBCARRIER
S --- SOUND CARRIER

P2 --- 90° SHIFTED VIDEO CARRIER $I_1$ --- VIDEO CARRIER
C --- COLOR SUBCARRIER
S --- SOUND CARRIER

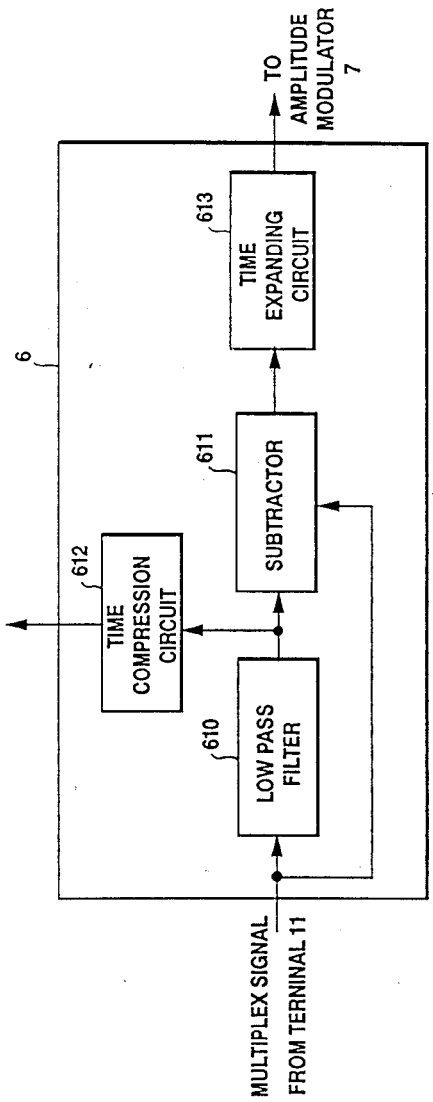
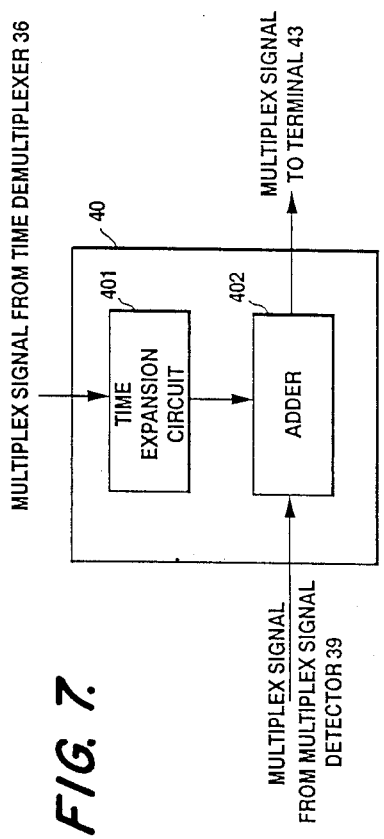

MULTIPLEX TV SIGNAL PROCESSING APPARATUS

BACKGROUND OF THE INVENTION

1. Field of the Invention

This invention relates to an apparatus for multiplexing a specific signal with an amplitude modulated television signal, transmitting and receiving the multiplexed signal, and extracting the specific signal from the multiplexed signal.

2. Description of the Prior Art

More than 30 years have passed since the color television broadcasting of the current NTSC (National Television System Committee) system began in 1960. Recently, in search of finer definition and higher performance television system, several new systems including HDTV (High Definition Television) system developed by NHK (The Japan broadcasting Corporation) have been proposed. At the same time, the contents of the programs presented to viewers have been changed from the mere studio programs to programs providing higher quality images and more realistic feeling such as cinema-size movies.

The current NTSC broadcasting is standardized by 2:1 interlaced 525 scanning lines, luminance signal bandwidth of 4.2 MHz, and aspect ratio of 4:3. (See, for example, Pritchard, "US Color Television Fundamentals —A Review", IEEE Trans. Consumer Electron., vol. CE-23, pp. 467–478, Nov. 1977.)

In this background, several television signal composition methods aiming at compatibility with the current broadcasting system and enhancement of horizontal resolution have been proposed. One of such examples is presented in a paper of Fukinuki and Hirano, "Extended Definition TV Fully Compatible with existing Standards", IEEE Trans. Commun., vol. COM-32, pp. 948–953, Aug. 1984. Considering the NTSC television signal expressed on a two-dimensional plane of temporal frequency f1 and vertical frequency f2, chrominance signals C are present in the second and fourth quadrants due to the phase relations to the chrominance subcarrier fsc. The Fukinuki et al example uses the vacant first and third quadrants for multiplexing the high frequency components of luminance signal. The chrominance signal and the multiplex high frequency components are separated and reproduced at the receiving end, thereby enhancing the horizontal resolution. In this example, the conventional NTSC receiver would be interfered by the multiplex signal, because the example has no ability for separating the chrominance signal from the multiplex high frequency components.

In the current television broadcast, as clear from the description above, signal bandwidth is limited by the standard, and it is not easy to add some new information in good quality. For example, other methods to enhance the horizontal resolution are proposed (M. Isnrdi et al, "A Single Channel NTSC Compatible Widescreen EDTV System", HDTV Colloquium in Ottawa, Oct., 1987), but many problems are left unsolved from the viewpoint of the compatibility with the current television broadcasting and deterioration of demodulation characteristics of high frequency components in a moving picture. Besides, from the standpoint of effective use of the frequency resources, the transmission band cannot be extended as an easy way.

We invented a method of superposing a signal by using quadrature modulation of the video carrier (U.S. patent application No. 70804) By this method, various signals can be transmitted using newly established quadrature channel and the interference to the conventional NTSC receiver is very small in principle. But the interference can be detected in practice, because of the incompleteness of characteristics of filters at the receiver and transmitter.

This invention is one of solutions to this practical problem when quadrature modulation is carried into practical use. Even if the incompleteness of such circuits as filters occurs, the interference to the conventional NTSC receivers can be reduced down to the acceptable level. In this sense, this invention is very useful when quadrature modulation of the video carrier is implemented.

SUMMARY OF THE INVENTION

It is a primary object of this invention to provide a multiplex signal processing apparatus for multiplex transmission of a large quantity of information in a limited bandwidth without interference to the current receiver.

According to this invention, a multiplex signal processor at a transmitter side replaces hidden portions of the main NTSC signal (the portions which are not displayed on a screen by overscanning of a receiver) and front porch of horizontal synchronous signal of the main NTSC signal with a first specific multiplex signal, amplitude-modulates a main video carrier by the main signal to obtain a vestigial side band (VSB) signal, and amplitude-modulates a carrier which is same in frequency as and shifted in phase by 90 degrees from the main carrier by a second specific multiplex signal to obtain a double side band signal. The modulated multiplex signal is passed through an inverse Nyquist filter to obtain a vestigial side band (VSB) signal, and then superposed on the modulated main signal to obtain a multiplexed signal, which is transmitted.

A multiplex signal processor at a receiver side has a synchronous detector and a quadrature distortion eliminating filter for demodulating the main and multiplex signals from the multiplexed signal received.

By this constitution, it is possible to obtain not only the conventional television broadcasting images but also multiplex information at the receiver, by generating a television signal capable of multiplex transmission of other information within the standard band of the existing television broadcasting.

As an example, if side panels (signals which correspond to the left and right sides of a whole image) of a wider aspect picture than the conventional 4:3 are transmitted as the first and second multiplex signals, the wider aspect picture can be generated at a receiver end from the main signal (4:3 NTSC) and the multiplex signals (side panels). In this case, low and high frequency components of the side panels can be transmitted as the first and second multiplex signal, respectively. DC component of the first multiplex signal can be easily transmitted, so as to keep continuity between the side panels and center panel (signal which corresponds to the 4:3 aspect ratio image). On the other hand, the second multiplex signal can be easily scrambled to reduce the interference to the conventional receivers.

By employing the above mentioned techniques, when the multiplex signal is received by an existing television receiver, there is almost no interference by the multiplex signal. In other words, the compatibility with the existing television receivers can be maintained. Furthermore, the feature that multiplex transmission of other information is possible in a frequency band determined by the standard is very advantageous also from the viewpoint of effective use of frequency resources.

BRIEF DESCRIPTION OF THE DRAWINGS

FIG. 6 is a block diagram of the signal separator;

FIG. 7 is a block diagram of the signal composer;

DETAILED DESCRIPTION OF THE PREFERRED EMBODIMENTS

Figure 1A:
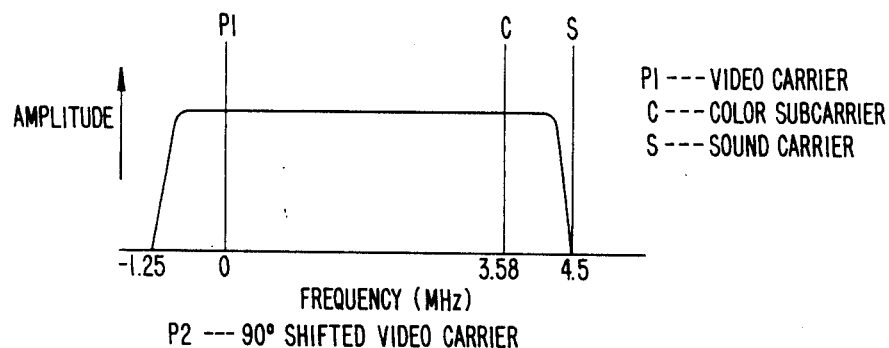
FIGS. 1(a)–(c) and FIGS. 11(f)–(j) are spectral diagrams showing the processing method of the multiplex signal processor at the transmission side according to this invention.
Figure 1B:
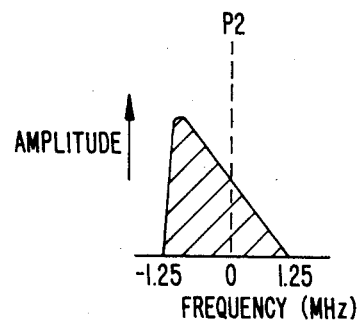
Figure 1C:
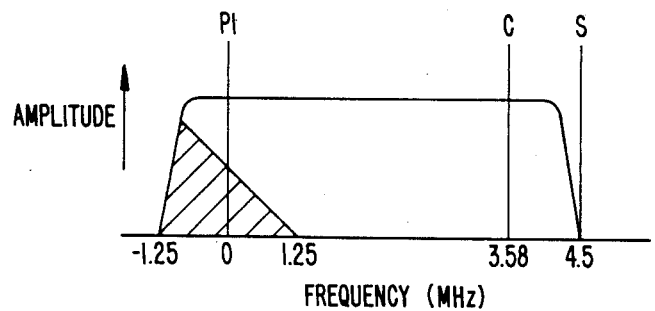

FIGS. 1(a)–(c) are spectral diagrams to show a television signal processing method at the transmission side. More specifically, FIG. 1(a) is a spectral diagram of a vestigial side band, amplitude modulated television signal in the NTSC television system, in which the lower side band of a video carrier P1 is the vestigial side band. In this case, the signal may be any television signal amplitude modulated, and thus it is not limited to the NTSC television signal.

FIG. 1(b) is a spectrum of a signal which is obtained by amplitude modulating a multiplex signal by a carrier P2 which is same in frequency as and different in phase by 90 degrees from the video carrier P1 and passing the modulated signal through a special filter which is called "inverse Nyquist filter". The frequency characteristic of the inverse Nyquist filter is $-6$ dB at frequency P2, infinite attenuation at P2+1.25 MHz, and no attenuation at P2−1.25 MHz. Preferably, the carrier P2 is removed in the blanking period of the main television signal.

The signal shown in FIG. 1(b) is multiplexed with the main television signal shown in FIG. 1(a) to obtain a composite signal as shown in FIG. 1(c). The multiplex signal may be either analog signal or digital signal.

Figure 2:
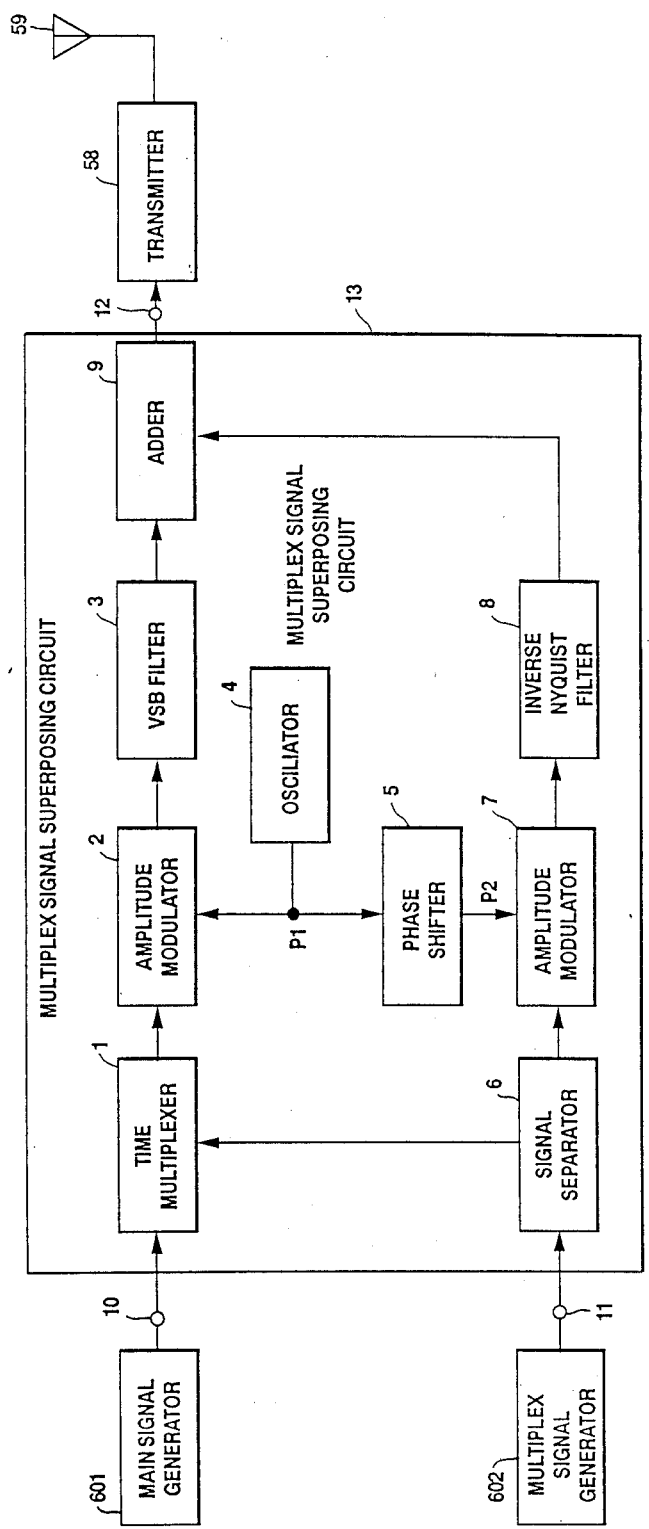
FIG. 2, FIG. 12(a), FIG. 16(a), and FIG. 18(a) are block diagrams each showing a multiplex signal processor at the transmission side embodying this invention.

FIG. 2 is a block diagram showing a television multiplex signal processor at the transmission side as an embodiment of this invention. A main signal generator 601 generates a main signal such as a video base band signal. A multiplex signal generator 602 generates a multiplex signal which is either analog or digital signal. The main and multiplex signals are fed to a multiplex signal superposing circuit 13 through input terminals 10 and 11, respectively.

In the multiplex signal superposing circuit 13, the multiplex signal is separated at a signal separator 6 into two parts, one of which is multiplexed with the main signal at a time multipler 1, and the other is amplitude-modulated at an amplitude modulator 7.

Figure 5:
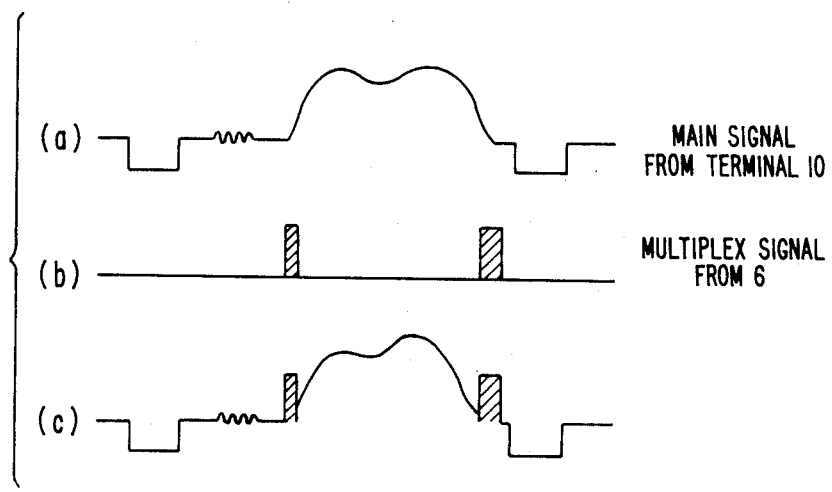
FIG. 5 shows wave forms to explain the function of the signal separator.

FIG. 5 shows the function of the time multiplexer 1 in the case that the main signal is the video base band signal. In FIG. 5, a wave form (a) shows a composite video base band signal with a horizontal synchronous signal and a burst signal of chrominance subcarrier, (b) shows a multiplex signal from the signal separator 6, and (c) shows a time multiplexed signal which is output ted from the time multiplexer 1. In this case the multiplex signal from the signal separator 6 is multiplexed at the hidden portions of over-scanning and front porch of horizontal synchronous signal of the main video base band signal. By the main signal coming from the time multiplexer 1, the video base band signal multiplexed with a part of multiplex signal, a carrier P1 generated by an oscillator 4 is amplitude-modulated at an amplitude modulator 2. The obtained modulated signal is filtered by a VSB filter 3 to become a vestigial side band signal, which is fed to an adder 9. The VSB filter 3 is a filter to transform a double side band signal into a vestigial side band signal. The carrier P1 from the oscillator 4 is shifted in phase by 90 degrees at a phase shifter 5 to be a carrier P2.

FIG. 6 shows an example of the signal separator 6.

In FIG. 6, the multiplex signal generated by the multiplex signal generator 602 is fed to a low-pass filter 610 and a subtractor 611. Low frequency component of the multiplex signal from the low-pass filter 610 is fed to a time compression circuit 612 and the subtractor 611. The low frequency component is time-compressed at the time compression circuit 612 and fed to the time multiplexer 1. On the other hand, high frequency component of the multiplex signal is obtained at the subtractor 611 and time-expanded at a time expanding circuit 613 to a narrower bandwidth signal, which is fed to the amplitude modulator 7. In this example, the input multiplex signal is separated by its frequency. Alternatively, any other attribute such as an amplitude and time of the input signal can be a factor of the signal separator.

Referring back to FIG. 1, by one of the two parts of the multiplex signal separated by the signal separator 6, the carrier P2 is amplitude-modulated in double side band at the amplitude modulator 7, and preferably in the blanking period the carrier is suppressed. The phase shift direction of the phase shifter 5 may be either fixed or varied at intervals of horizontal scanning period, field or frame. The modulated multiplex signal is limited in the band by an inverse Nyquist filter 8, and then fed to the adder 9. The amplitude frequency characteristic of the inverse Nyquist filter 8 is symmetrical to an amplitude frequency characteristic immediately before video detection at the receiver with respect to the video carrier.

The output of the adder 9 is a composite signal. That is, the modulated multiplex signal is superposed on the modulated video base band signal at the adder 9 to obtain the composite signal. The composite signal appearing at an output terminal 12 of the multiplex signal superposing circuit 13 is transmitted from a transmitter 58 with an antenna 59. The transmission path is not limited to the wireless system, but may be a wired system. In this example, the composite signal is obtained by adding the outputs of the VSB filter 3 and the inverse Nyquist filter 8, but it is also possible to feed the sum of the outputs of the amplitude modulator 2 and the inverse Nyquist filter 8 into the VSB filter 3 to obtain the composite signal.

Figure 3A:
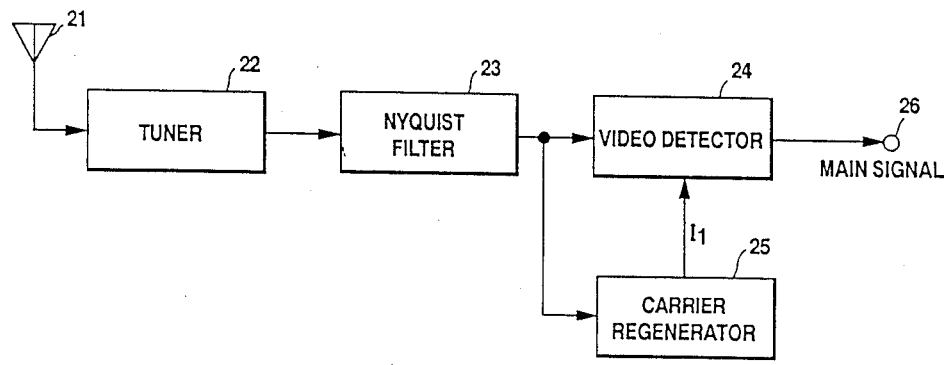
FIGS. 3(a), (b), and (c) are block diagram, spectral diagram, and vector diagram showing a conventional television receiver when receiving the composite signal generated by the multiplex signal processor.

On the other hand, a television multiplex signal processor at the reception side is as follows. The following example refers to terrestrial broadcasting of the NTSC television system, but is is not intended as limitation. FIG. 3(a) is a block diagram of an existing television receiver with a synchronous video detector. The signal transmitted from the transmission side is received by an antenna 21, converted in frequency to an intermediate frequency band by a tunner 22, and limited in the band by a Nyquist filter 23. The band-limited signal is fed into a video detector 24 and a carrier regenerator 25. In the carrier regenerator 25, the video carrier I1 for synchronous detection is regenerated. The band-limited signal is synchronously detected by the carrier I1 at the video detector 24 to obtain the main signal, that is the video base band signal, at an output terminal 26.

Figure 3B:
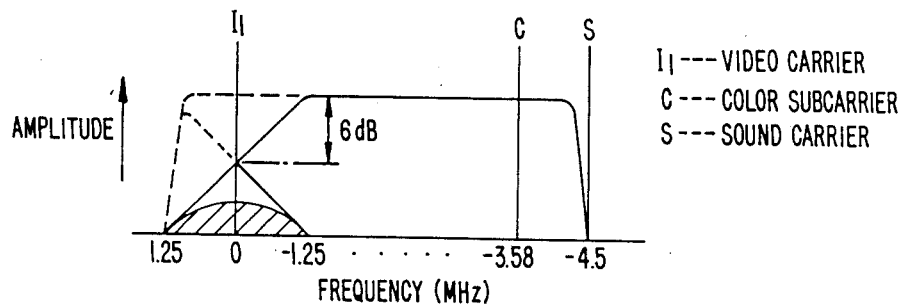

The frequency characteristic of the Nyquist filter 23 is as follows. Referring to FIG. 3(b) which shows the frequency characteristic of the Nyquist filter 23, the amplitude is attenuated by 6 dB at the video carrier I1, and the Nyquist filter characteristic possesses nearly an odd-symmetrical amplitude property with respect to the video carrier I1.

Figure 3C:
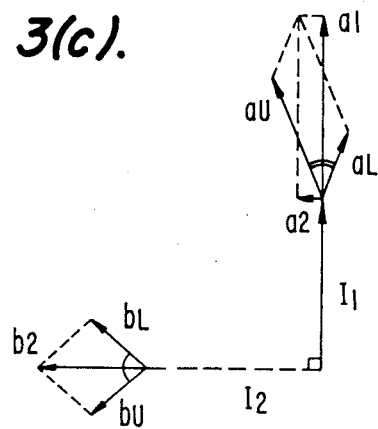

On the other hand, as shown in FIG. 1(b), when the multiplex signal is limited in band by the inverse Nyquist filter 8 in the transmitter having an inverse characteristic to the frequency characteristic of the Nyquist filter 23 in the receiver, the multiplex signal components in the shaded area in FIG. 3(b) is nearly double side band. This can be expressed by a vector diagram as shown in FIG. 3(c), in which I1 is the video carrier of the main signal, that is, the video base band signal, and I2 is the carrier of the multiplex signal which carrier is same in frequency as but different in phase by 90 degrees from I1. The video base band signal is a vestigial side band with respect to the carrier I1, so that the upper and lower side bands are vector aU and vector aL, respectively, which are vector a1 and vector a2, respectively, when decomposed into orthogonal vectors. Since the upper and lower side bands of the multiplex signal are expressed by vector bU and vector bL, respectively, their synthetic vector is b2, which is only the component to intersect with vector I1 orthogonally.

That is, when the main signal is synchronously detected by the carrier I1, quadrature distortion due to the vector a2, vector b2 components does not occur. Thus, the impairment by the multiplex signal to the existing television receiver performing video synchronous detection does not occur in principle.

Figure 4A:
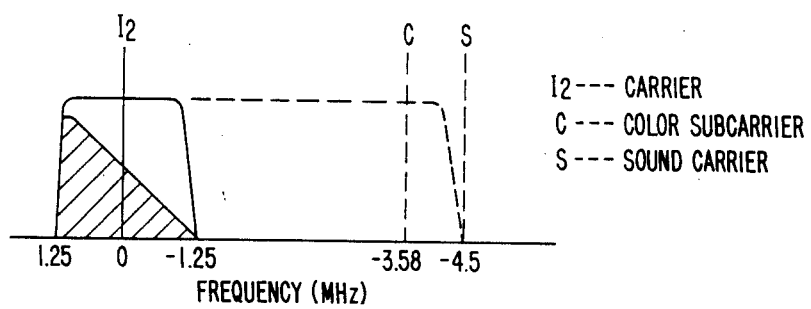
FIG. 4(a) is a spectral diagram showing the processing method of the multiplex signal processor at the reception side according to this invention.
Figure 4B:
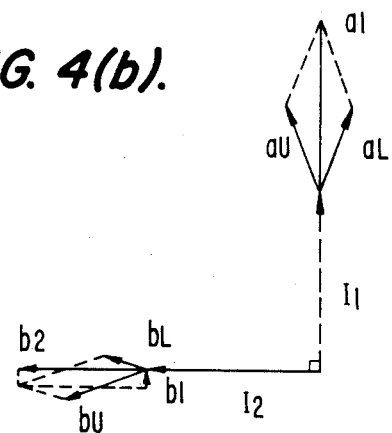
FIG. 4(b) is a vector diagram to explain the principle of the multiplex signal processor at the reception side according to this invention.

Next, detection of the multiplex signal at the reception side is described below. The signal of the video intermediate frequency band which is the output of the tuner 22 is limited in band by a band-pass filter, as shown in FIG. 4(a), so that the main signal, that is, the video base band signal, becomes double side band. Its vector expression is shown in FIG. 4(b). Since the multiplex signal is vestigial side band, the upper and lower side bands are vector bU and vector bL, respectively, their synthetic vector is a1, which is only the component intersecting orthogonally with the vector I2.

That is, when the multiplex signal is synchronously detected by the carrier I2, quadrature distortion due to the vector a1, vector b1 components does not occur. Thus, only the multiplex signal components can be demodulated.

Figure 4C:
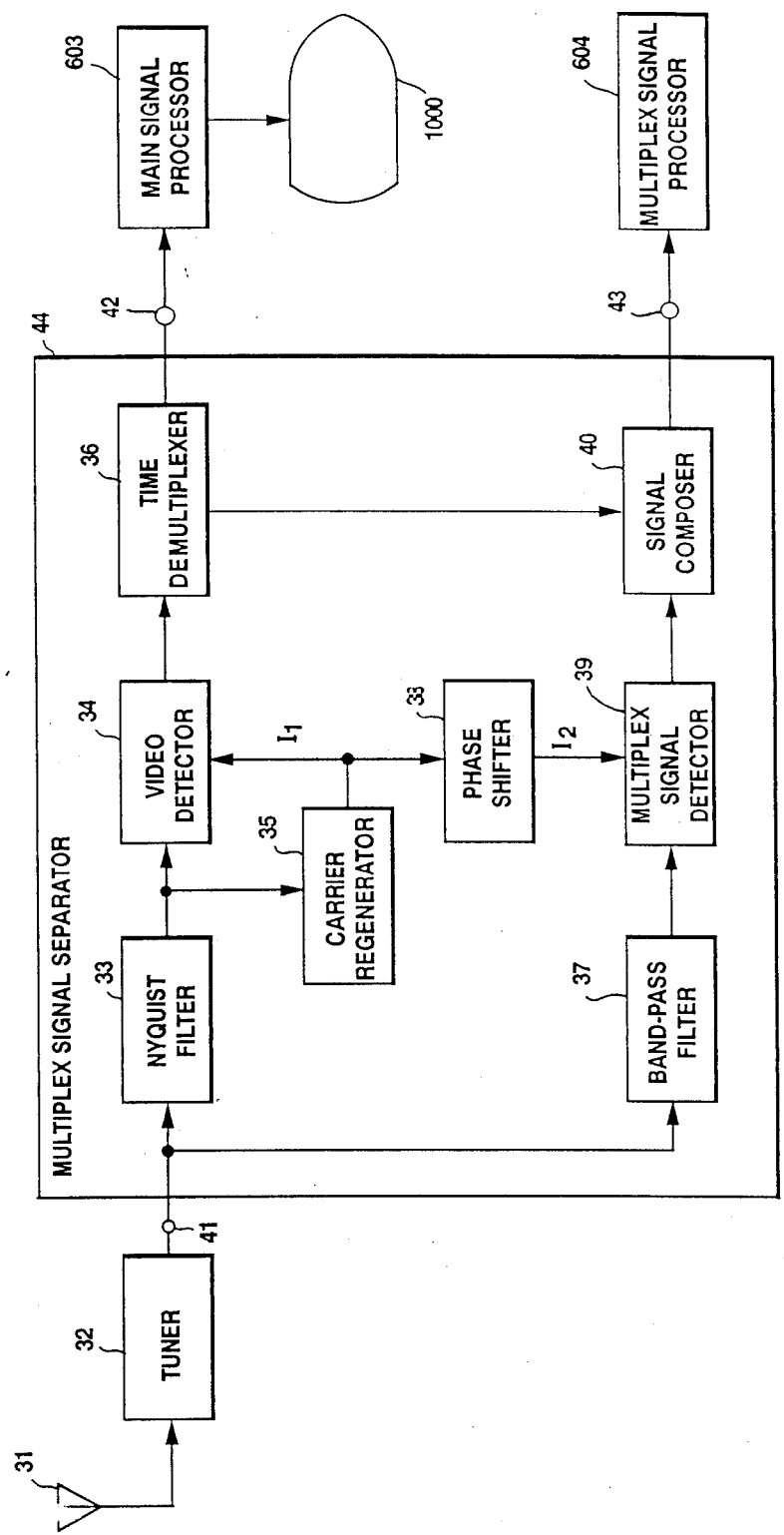
FIG. 4(c), FIG. 12(b), FIG. 18(b), and FIG. 16(b) are block diagrams each showing a multiplex signal processor at the reception side embodying this invention.

FIG. 4(c) shows an example of television multiplex signal processor for demodulating the multiplex signal as well as the main signal. The multiplexed signal transmitted from the transmission side is received by an antenna 31, converted in frequency into an intermediate frequency band by a tuner 32, and fed to a multiplex signal separator 44 through an input terminal 41 thereof. The fed signal is limited in the band by a Nyquist filter 33. The band-limited signal is fed to a video detector 34 and a carrier regenerator 35. In the carrier regenerator 35, the video carrier I1 for synchronous detection is regenerated. The band-limited signal is synchronously detected by the carrier I1 in the video detector 34, and fed to a time demultiplexer 36. In the time demultiplexer 36 the main signal and the first multiplex signal are separated. This processing is just the opposite to that of the time multiplexer 1 in the multiplex signal superposing circuit 13 at the transmission side. The first multiplex signal is fed into a signal composer 40 and the main signal, the base band video signal, goes to an output terminal 42 of the multiplex signal separator 44.

The main signal is converted into, for example, R, G, B signals by a main signal processor 603, and displayed on a CRT screen 1000.

The output of the tuner 32 is band-limited also as shown in FIG. 4(a) by a band-pass filter 37. By the carrier I2 obtained by 90 degrees phase shifting the carrier I1 by a phase shifter 38 (that is, by the carrier I2 in the same phase as the carrier for multiplex signal modulation used at the transmission side), the band-limited signal is synchronously detected in a multiplex signal detector 39 to obtain the second multiplex signal. The second multiplex signal is composed into the original multiplex signal together with the first multiplex signal at the signal composer 40.

FIG. 7 shows an example of the signal composer 40. In this figure, the first multiplex signal from the time demultiplexer 36 is time-expanded at a time expansion circuit 401. The second multiplex signal from the multiplex signal detector 39 is added to the time-expanded first multiplex signal at an adder 402. The composed multiplex signal, which is the output of the adder 402, is fed to an output terminal 43 of the multiplex signal separator 44. In the multiplex signal generator 604, the composed multiplex signal is subjected to the reverse processing to the processing by the multiplex signal generator 602 at the transmission side.

As described above, in the existing receiver, since the multiplex signal is substantially canceled by the synchronous detection by the video carrier I1, the main signal is not interfered by the multiplex signal. Further, in the receiver capable of demodulating the multiplex signal, not only the main signal, that is, the video base band signal, is obtained in the same way as above, but also the multiplex signal can be also obtained without quadrature distortion by filtering and synchronous detection by the carrier I2. This is not limited to the NTSC television system, and can be applied to any system as far as the main signal is amplitude-modulated in the vestigial side band.

Figure 8A:
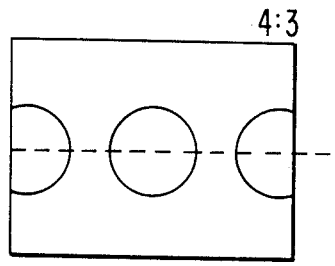
FIG. 8 is an example of display screen of existing television and a time-axis expression of composite video signal.
Figure 8B:
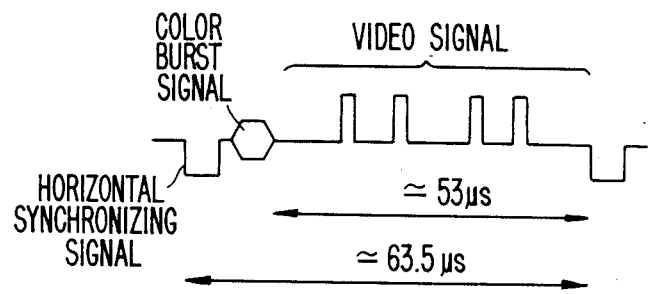
Figure 9A:
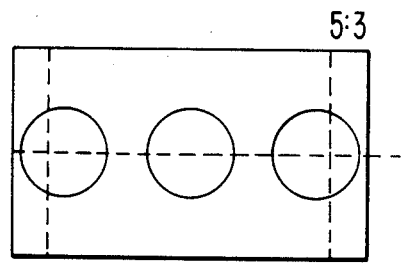
FIG. 9 is an example of display screen with aspect ratio of 5:3 and time-axis expression of composite video signal.
Figure 9B:
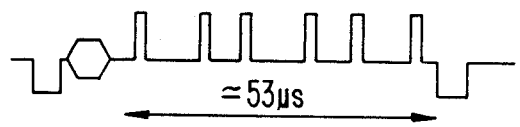

FIG. 8 and FIG. 9 show the concept of a wide-screen television system. In these figures, the aspect ratio of the wide-screen television system is assumed to be 5:3 but it may not be limited to such ratio. In FIG. 8, the present NTSC picture (a) and its corresponding wave form (b) are depicted, in which a circle and 2 arcs are displayed on the 4:3 frame. FIG. 9 shows 5:3 picture (a) and its corresponding wave form (b), in which 3 circles are displayed. Only when we see 5:3 picture in FIG. 9, 3 circles are recognized. For this purpose of clear recognition, side panels should be transmitted as the multiplex signal.

Figure 10:
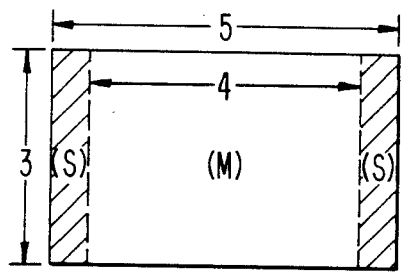
FIG. 10 is a picture composition at different aspect ratio.

FIG. 10 shows the difference between the aspect ratios of the conventional NTSC system and the wide-screen television system. In this figure, (s) means side panels which is treated as one signal and transmitted as the multiplex signal and (M) means center panel which corresponds to the present 4:3 frame (the main signal).

Figure 11A:
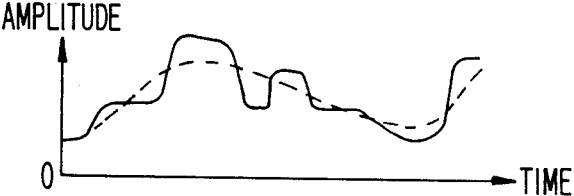
FIGS. 11(a)–(e) are signal waveform diagrams showing the signal processing steps in FIG. 6 according to this invention.
Figure 11B:
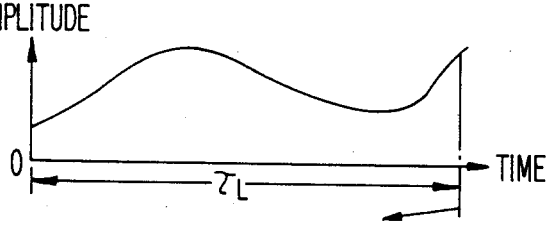
Figure 11C:
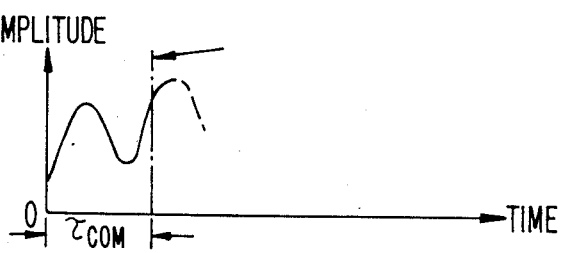
Figure 11D:
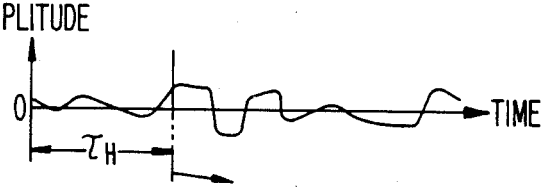
Figure 11E:
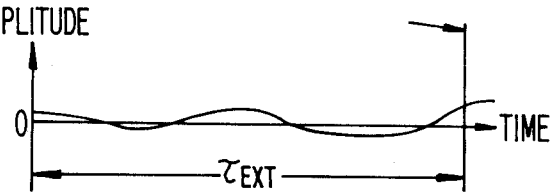
Figure 11F:
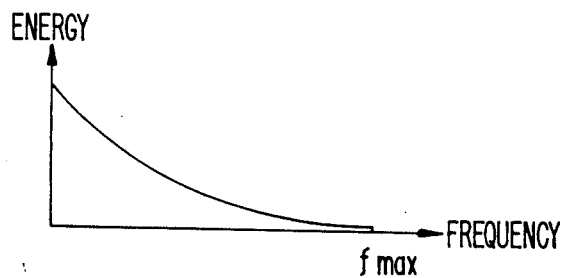
Figure 11G:
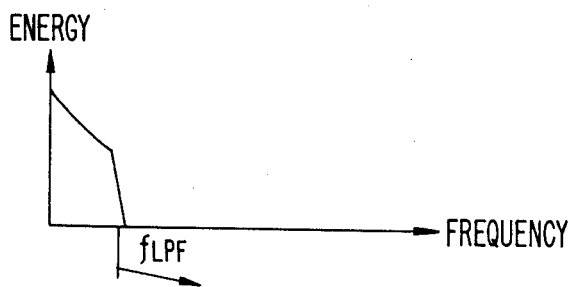
Figure 11H:
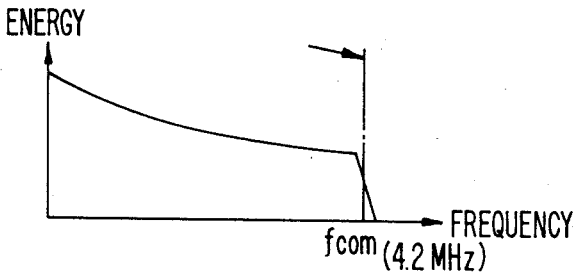
Figure 11I:
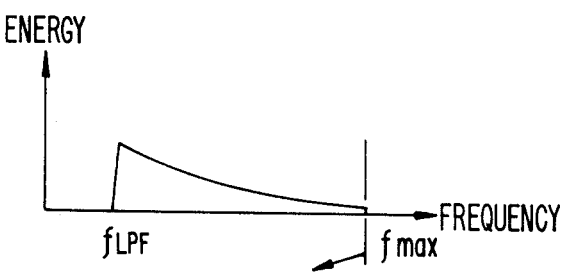

These side panels and center panel have the same frequency band, but the band width of the multiplex signal should be, at most, 1.25 MHz according to the above explanation. FIGS. 11 (a)–(j) show wave forms and power spectrums of various points of the signal separator 6 in FIG. 6. FIG. 11(a) is the multiplex signal which corresponds to the two parts of side panels. FIG. 11(f) shows a typical power spectrum of the above multiplex signal. First, the input multiplex signal (FIG. 11(a)) is fed to the low-pass filter 610, where the low frequency component (FIG. 11(b) shows its wave form and (g) shows its power spectrum) is obtained. This signal is time-compressed at the time compression circuit 612 which bandwidth is increased up to that of the original signal. FIG. 11(c) shows this time-compressed signal and (h) shows its power spectrum. On the other hand, the high frequency component (FIG. 11(d) shows its wave form and (i) shows its power spectrum) is obtained at the subtractor 611. This signal is time-expanded at the time expanding circuit 613. FIG. 11(e) shows the wave form of the time-expanded signal and (j) shows its bandwidth which is, at most, 1.25 MHz.

Thus, the multiplex signal is subjected to time-axis processing to be separated to two parts, one of which is transmitted through the main channel replacing the hidden portion of over scanning and front porch of synchronous signal, and the other is transmitted through quadrature modulation of the video carrier.

Figure 12A:
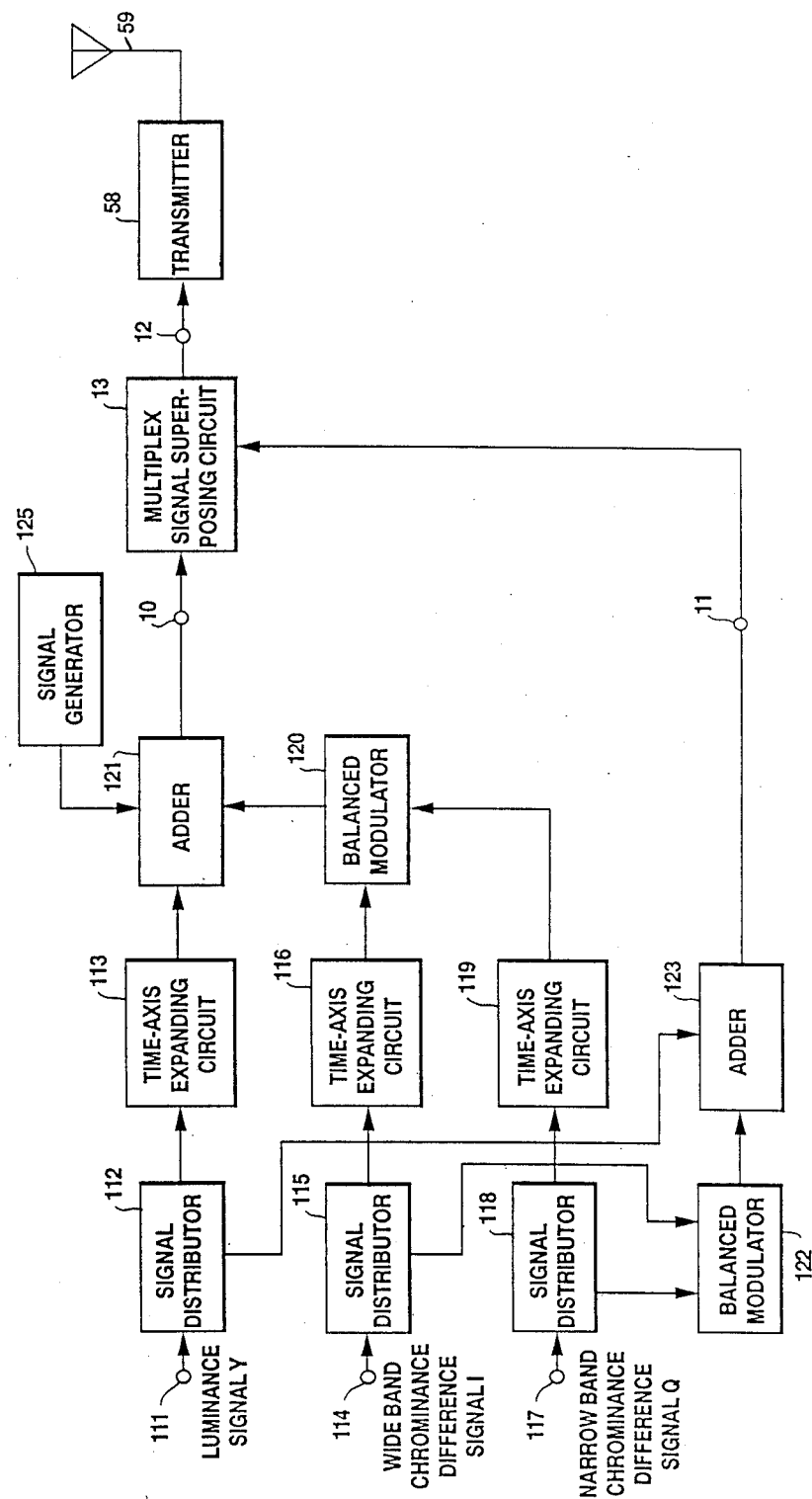

FIG. 12(a) is a block diagram showing a television multiplex signal processor with a wide aspect ratio at the transmission side. In FIG. 12(a), the signal fed to an to an input terminal 111 is a luminance signal Y obtained from a signal picked up by a camera having a wider aspect ratio (for instance, 16:9) than the existing one, the signal fed to an input terminal 114 is a wide band chrominance difference signal I obtained from the same picked-up signal, and the signal fed to an input terminal 117 is a narrow band chrominance.

The luminance signal Y enters a signal distributor 112, to be distributed into a time-axis expanding circuit 113 and an adder 123. Similarly, the wide band chrominance difference signal I and the narrow band chrominance signal Q enter respective signal distributors 115 and 118, to be distributed into time-axis expanding circuits 116 and 119, respectively, and a balanced modulator 122. Each of the time-axis expanding circuits time-expand the entered signal by, for example, varying the writing and reading clocks of a memory provided therein.

When the original picture is picked up at an aspect ratio of m:3 (m is a real number not smaller than 4) stretched laterally, the picked-up signal corresponding to the portion displayed on the screen of the existing television receiver is expanded in the time-axis by m/4 times in the time-axis expanding circuits 113, 116, 119.

Next, of the chrominance difference signals distributed by the signal distributors 115, 118, the remaining chrominance difference signals other than those expanded by the time-axis expanding circuits 116, 119 are modulated by the balanced modulator 122, and are combined with the remaining luminance component other than the luminance signal expanded by the time-axis expanding circuit 113 by the adder 123. The output of the adder 123 is fed into the multiplex signal superposing circuit 13 through the multiplex signal input terminal 11 as a multiplex signal.

The output signals of the time-axis expanding circuits 116, 119 are modulated by a balanced modulator 120, and the output of the balanced modulator 120 is added by an adder 121 to the output signal from the time-axis expanding circuit 113 and a synchronous signal, a burst signal and a discriminating signal which are produced at a signal generator 125. The discriminating signal is for distinguishing the composite television signal of this processor from the conventional television signal. The discriminating signal may be, for example, superposed in the vertical blanking period.

The output of the adder 121 is fed into the multiplex signal superposing circuit 13 through the main signal input terminal 10 as a main signal. The output of the multiplex signal superposing circuit 13 appearing at the terminal 12 is a composite signal in which the multiplex signal is superposed on the video base band main signal. The composite signal is transmitted through the transmitter 58 and the antenna 59.

Figure 13A:
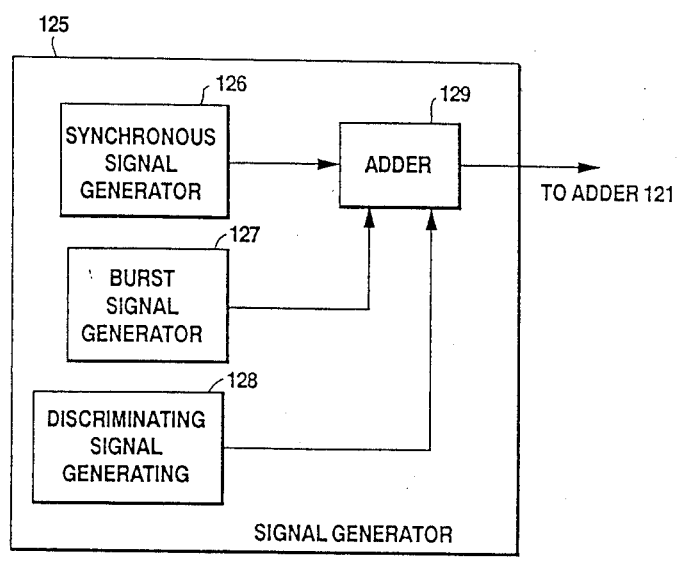
FIG. 13(a) is an internal circuit composition of a signal generator 125 in FIG. 12(a)

FIG. 13(a) is a block diagram of the signal generator 125 in FIG. 12(a), in which a synchronous signal generator 126 and a burst signal generator 127 generate a synchronous signal and a burst signal, respectively, which are the same as those in the conventional broadcasting system.

Figure 13B:
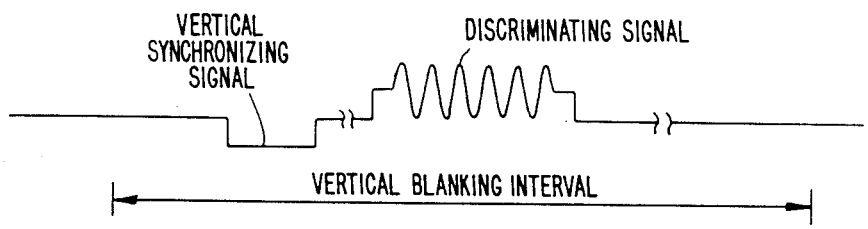
FIG. 13(b) shows an example of discriminating signal.

A discriminating signal generator 128 generates a discriminating signal to distinguish whether a picture of the wide aspect ratio is sent out or not. The discriminating signal is, for example, a pilot signal or the like superposed in the blanking period as shown in FIG. 13(b). The sum of the outputs of these three generators 126, 127, 128, is delivered as an output from the signal generator 125.

Figure 12B:
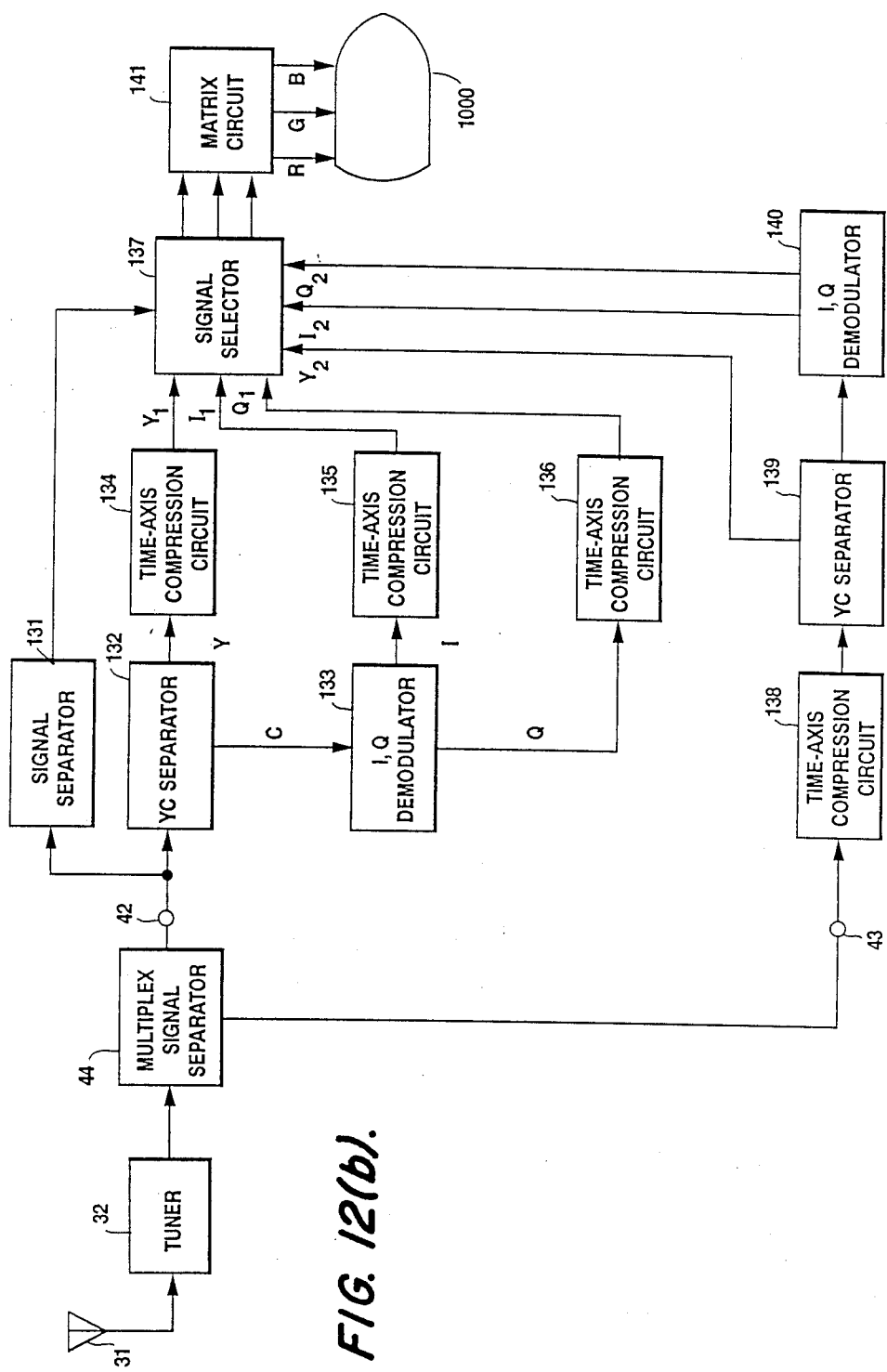

FIG. 12(b) is a block diagram showing a television multiplex signal processor with a wide aspect ratio at the reception side. The composite signal transmitted from the transmission side like the one as shown in FIG.

12(a) and received via an antenna 31 and a tuner 32 is separated at a multiplex signal separator 44 into the main signal and the multiplex signal, which are respectively delivered from a main signal output terminal 42 and a multiplex signal output terminal 43 of the multiplex signal separator 44. The video base band signal which is the main signal is separated into the luminance signal Y and the chrominance signal C by a YC separator 132. The signal Y is compressed in the time-axis by a time-axis compression circuit 134 to become a signal Y1. The signal C is separated into the chrominance difference signals I, Q by an I,Q demodulator 133. The signal I is compressed in the time-axis by a time-axis compression circuit 135 to become a signal I1. The signal Q is compressed in the time-axis by a time-axis compression circuit 136 to become a signal Q1. The multiplex signal is compressed in the time-axis by a time-axis compression circuit 138, and then is separated into signals Y2, I2 and Q2 by a YC separator 139 and an I,Q demodulator 140. The signals Y1, I1, Q1, Y2, I2 and Q2 are fed into a signal selector 137, in which the signals Y1, I1 and Q1 are selected for the portion corresponding to the center panel of the conventional television receiver with aspect ratio of 4:3. For the remaining portion of one horizontal scanning period, the blanking signal or the like is generated and selected when receiving the conventional television signal, and the signals Y2, I2 and Q2 are selected when receiving said wide television signal. A matrix circuit 141 produces R, G, B signals from the selected siignals outputed from the signal selector 137. The R, G, B signals are fed into the CRT 1000.

Incidentally, the time-axis compression circuits 134, 135, 136, 138 are provided to receive the conventional television signal without any trouble, and to reproduce the television signal by compressing the time-axis expanded portion of the wide television signal having an aspect ratio stretched laterally. That is, as clear from the comparison between FIG. 8(b) and FIG. 9(b), it is necessary to compress the time-axis of the conventional television signal in order to receive the picture of the existing broadcasting without changing the aspect ratio. The compression ratio is determined by the aspect ratio.

The signal separator 131 separates, from the video base band signal, the discriminating signal for distinguishing the television signal of the existing broadcasting from the synchronous signal, color burst signal, and the wide television signal. The signal selector 137 is controlled according to this discriminating signal.

Figure 14:
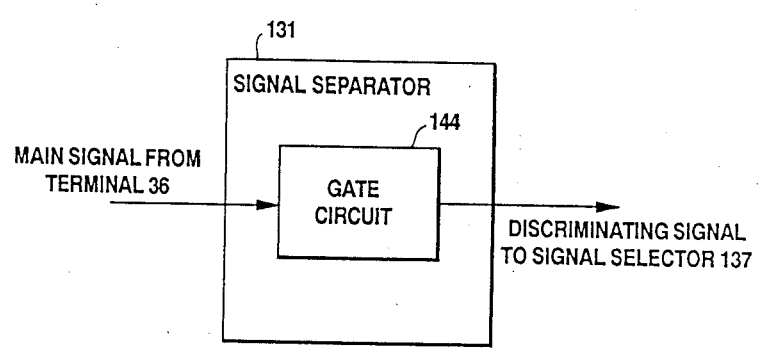
FIG. 14 is an internal circuit composition of a signal separator 131 in FIG. 12(b)

FIG. 14 is a block diagram of the signal separator 131 in FIG. 12(b), which comprises a gate circuit 144. The video base band signal which is the main signal is fed to the gate circuit 144. The discriminating signal is separated from the video base band signal by the gate circuit 144. Since the discriminating signal is superposed, for example, in the blanking period of the video base band signal, its separation is easy.

Figure 15:
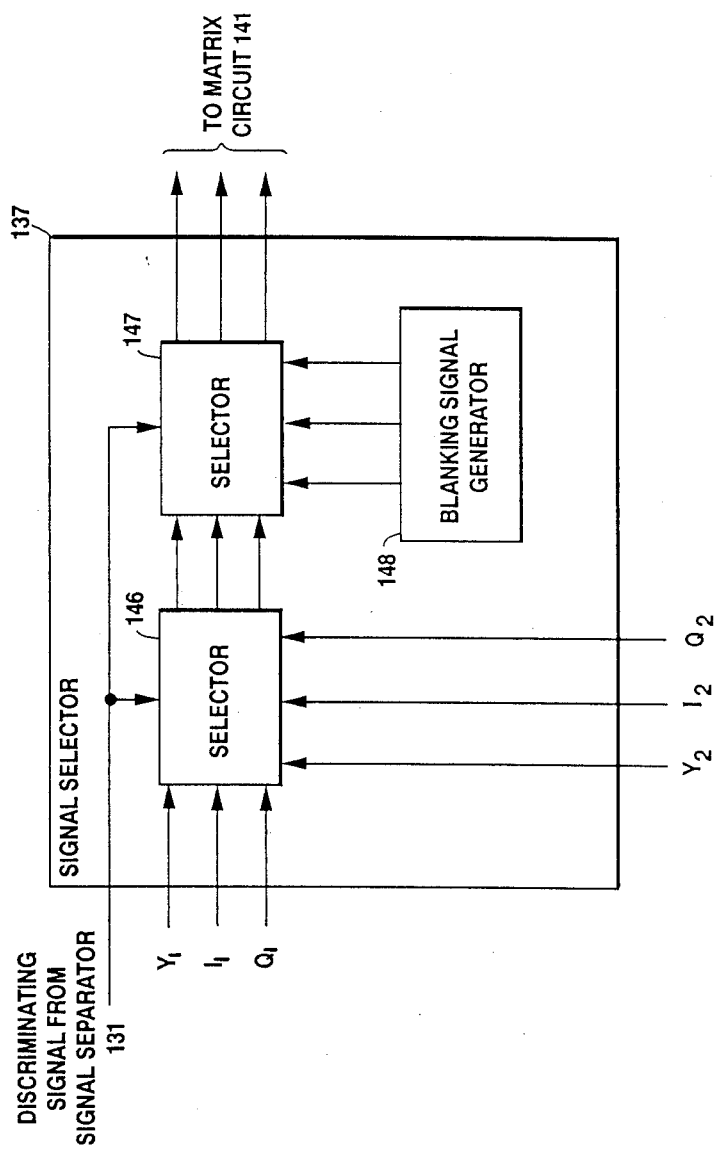
FIG. 15 is an internal circuit composition of a signal selector 137 in FIG. 12(b).

FIG. 15 is a block diagram of the signal selector 137 in FIG. 12(b). If it is judged that the received signal is not for a picture with wide aspect ratio by the discriminating signal, the signals Y1, I1 and Q1 are selected by selectors 146 and 147, and a blanking signal generated by a blanking signal generator 148 is selected in the blanking period. If it is judged that the received signal is for a picture with wide aspect ratio by the discriminated signal, the signals Y2, I2 and Q2 are selected by the selectors 146, 147.

The signal expanded in the time-axis is widened in the band when it is time-axis-compressed at the reception side, and therefore the resolution is not lowered even if the aspect ratio becomes larger. The multiplex signal not appearing on the screen of aspect ratio of 4:3 is nearly canceled in the conventional receiver by synchronous detection using the video carrier, so that interference by the multiplex signal hardly occurs. In the widescreen receiver, the multiplex signal containing video signal to be displayed on the side portions of a wide aspect ratio screen is reproduced by filtering and synchronous detection using the phase-controlled carrier without quadrature distortion. When the television signal having the conventional aspect ratio of 4:3 is received, it is displayed near the middle of the screen of aspect ratio of 5:3, and the both sides of the screen are, for example, blanked.

Figure 16A:
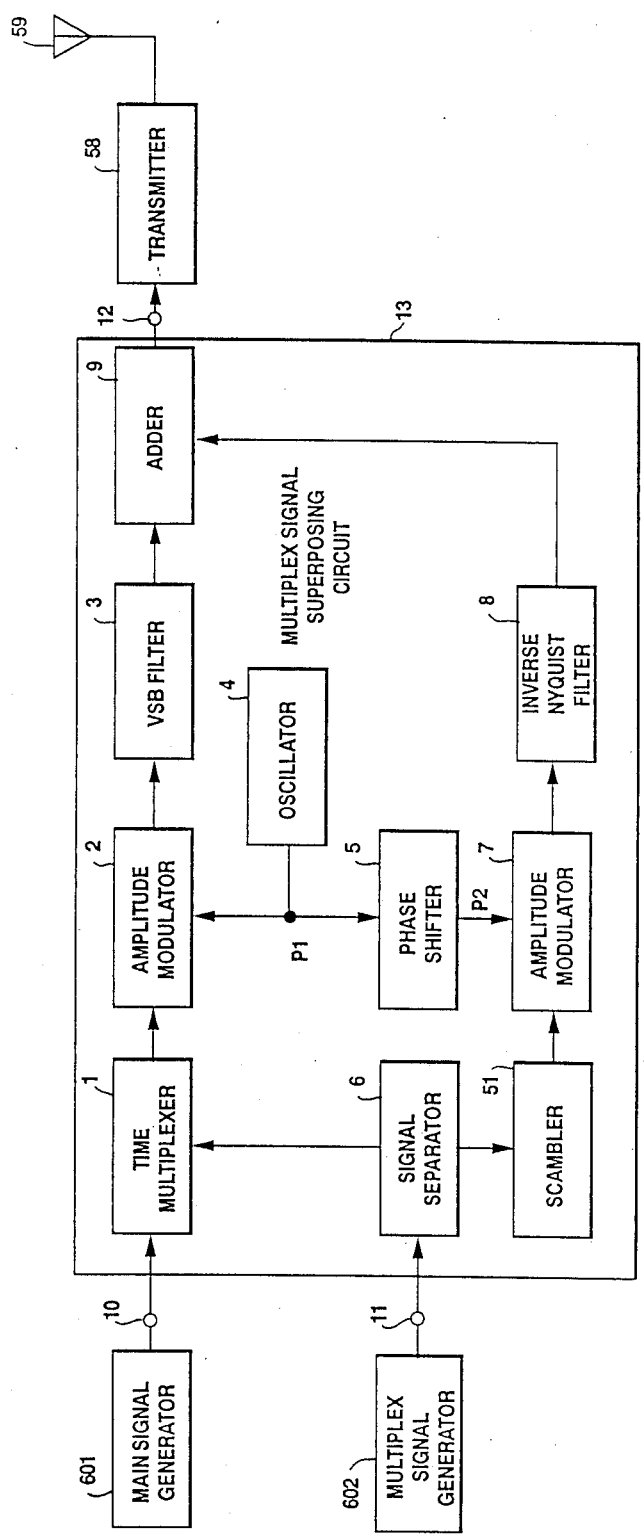

FIG. 16(a) is a block diagram of another multiplex signal processor at the transmission side. The difference between FIG. 2 and FIG. 16(a) is the presence of a scrambler 51. The main function of this scrambler is to reduce the interference to the conventional television receiver with an envelope video detector or quasi-synchronous video detector caused by the quadrature modulation by the multiplex signal. This scrambler is also used to use wide-screen television system as a pay television. There are many methods of scrambling, such as frequency inverting, time-axis inverting, exchanging line(s) by line(s), changing left side panel and right side panel, changing polarity of the multiplex signal line by line, and changing polarity of the multiplex signal field by field.

A multiplex signal generated by the multiplex signal generator 601 is fed to the signal separator 6 and separated, for example, by frequency to two parts. The first part, low frequency component, of the multiplex signal is fed to the time multiplexer 1 and processed as described before, and the second part, high frequency component, of the multiplex signal is fed to the scrambler 51.

Figure 17A:
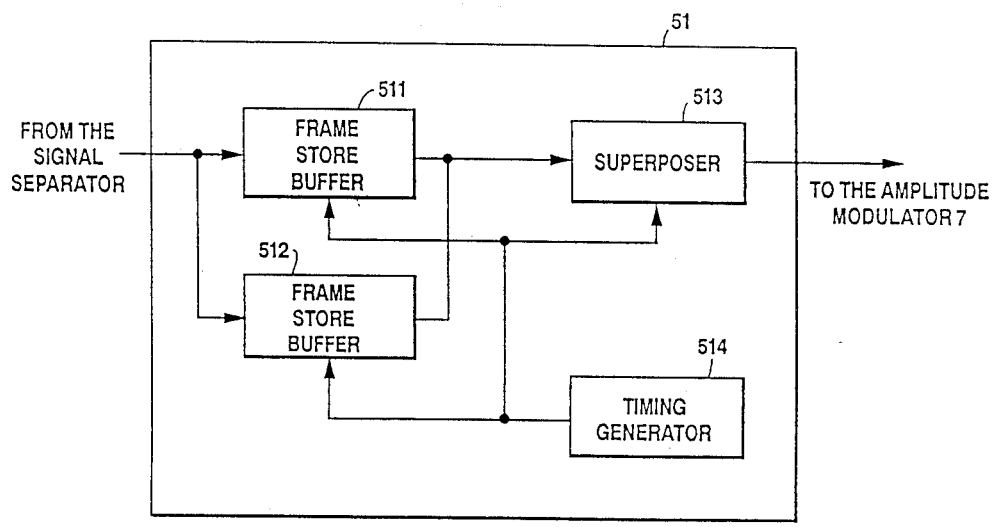
FIGS. 17(a) and (c) are block diagrams of two examples of the scrambler.

FIG. 17(a) shows a block diagram of a first example of the scrambler 51. In this example, the input multiplex signal is stored in a frame memory and retrieved therefrom according to a control signal from a timing generator 514. The multiplex signal, normally high frequency component, comes to two frame store buffers 511 and 512, and retrieved therefrom according to the control signal from the timing generator 514. The control signal is superposed in the vertical blanking period of the multiplex signal, for example.

Figure 17B:
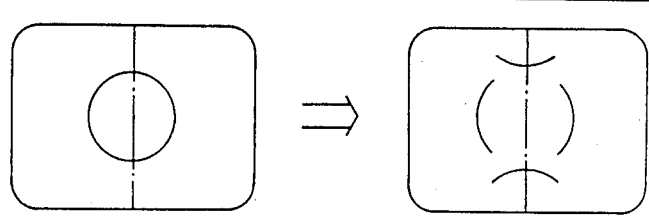
FIG. 17(b) is a figure to explain the scrambled picture.

FIG. 17(b) shows a display screen of scrambled multiplex signal. The left screen is the original multiplex signal at the input of this scrambler and the right screen is the output of the scrambler. In this example, the original multiplex signal is separated into three parts which are transposed within a field or frame. With the same block configuration as that shown in FIG. 17(a), other scramble method such as exchange of the left side and right side, polarity change line by line and so on, can be possible only if the address to frame buffers is changed.

Figure 17C:
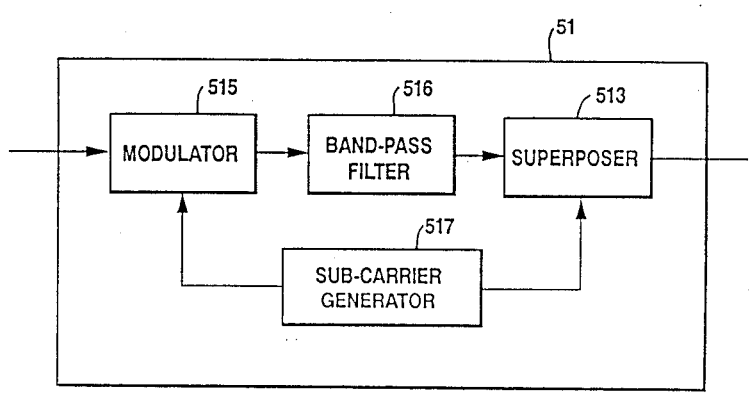

FIG. 17(c) is another example of the scrambler 51 in FIG. 16(a). In this example, the input multiplex signal is fed to a modulator 515 and modulated by a subcarrier fs from a subcarrier generator 517. This modulator may be an amplitude modulator and fs may be fsc/3 (fsc: subcarrier of chrominance signal, 3.579545MHz). The modulated multiplex signal is fed to a band-pass filter 516. In this case, if fs is about 1.2 MHz and the pass-band frequency of the band-pass filter 516 is from 0.16 MHz to 1.2 MHz at −6 dB points, the output signal from the band-pass filter is just frequency inverted to the original multiplex signal.

Figure 11J:
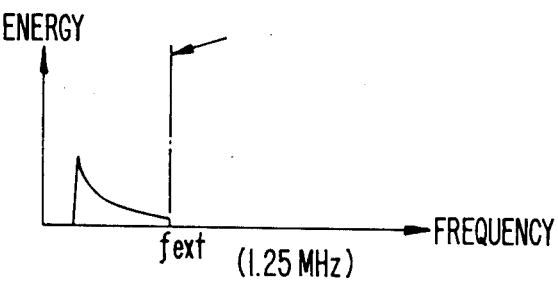

The power spectrum of the original multiplex signal is just like the one shown in FIG. 11(j), so the inverted multiplex signal has lower power at low frequency component and higher power at high frequency component.

From the spectral diagram shown in FIG. 3(b), the power of the quadrature multiplex signal at an existing television receiver is low at higher component and high at lower component. From this reason, the effect of this example is that the possible crosstalk to an existing receiver from the multiplex channel is smaller than the original superposing circuits in FIG. 2.

In the example shown in FIG. 17(c), subcarrier fs is superposed on the multiplex signal at a superposer 513, for example, in the vertical synchronous period, in order to descramble at the reception side.

Figure 16B:
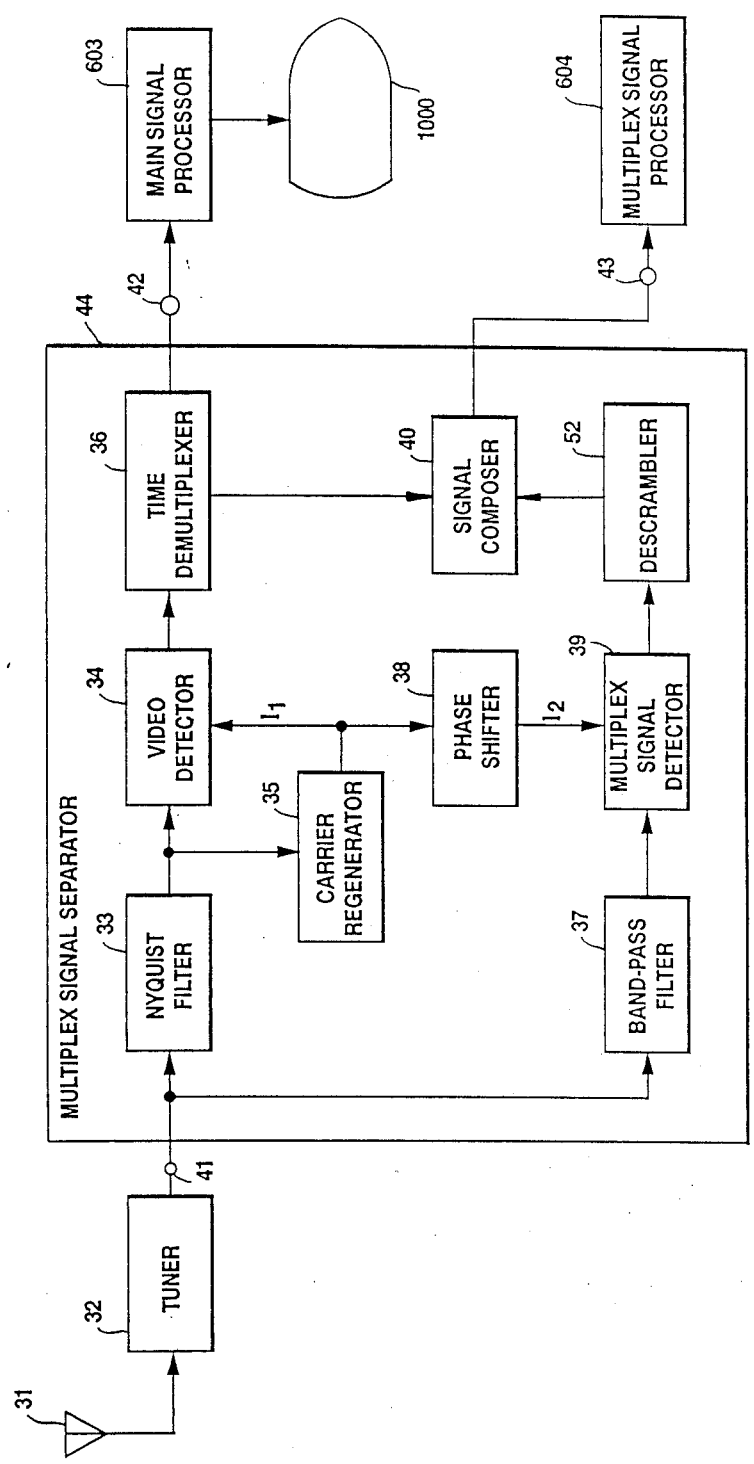

FIG. 16(b) is a block diagram of a multiplex signal processor at the reception side for receiving the multiplexed signal transmitted from the transmission side such as the one shown in FIG. 16(a). The multiplexed signal transmitted from the transmission side is received by the antenna 31, converted in frequency into the intermediate frequency band by the tuner 32, and limited in the band by the Nyquist filter 33. The band-limited signal is supplied into the video detector 34 and the carrier regenerator 35. In the carrier regenerator 35, a video carrier I1 for synchronous detection is regenerated. The band-limited signal is detected by the carrier I1 in the video detector 34, and fed to the time demultiplexer 36. In this demultiplexer the main signal and the first multiplex signal are separated. The first multiplex signal is, for example, superposed in the hidden portion of over scanning of the television receiver and/or the front porch of the horizontal synchronous signal. This processing is just the opposite of those of the time multiplexer 1 in the multiplex signal superposing circuit 13 at the transmission side shown in FIG. 16(a). The second multiplex signal is fed into a descrambler 52 and descrambled. This processing is just the opposite to that at the scrambler 51 of the transmission side and performed according to the superposed control signal, for example, the signal showing which line(s) is transposed to which line(s). After the multiplex signal is descrambled at the descrambler 52, it is fed into the signal composer 40 and composed with the first multiplex signal. Finally, the composed multiplex signal goes to the output terminal 43.

Figure 18A:
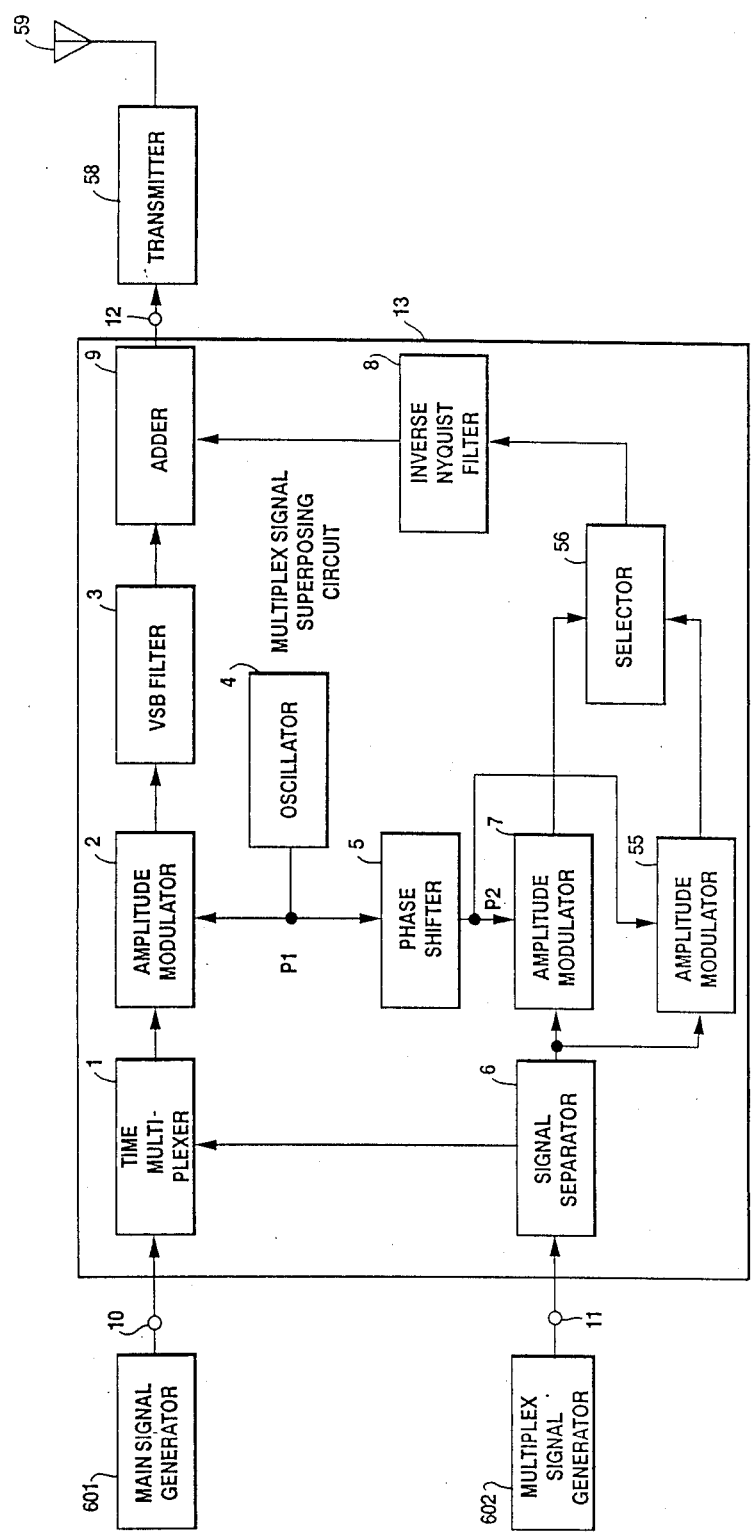

FIG. 18(a) shows a block diagram of still another multiplex signal processor at the transmission side. This figure shows another version of the multiplex signal superposing circuit 13 which performs an alternative quadrature amplitude modulation. By changing the polarity of amplitude modulation line by line, or field by field, the interference to an existing television receiver is reduced, or at least it becomes less sensitive to viewers. In FIG. 18(a), an amplitude modulator 55 is added and a selector 56 switchs modulated signals from the amplitude modulator 7 and the amplitude modulator 2 according to the defined sequence.

Figure 18B:
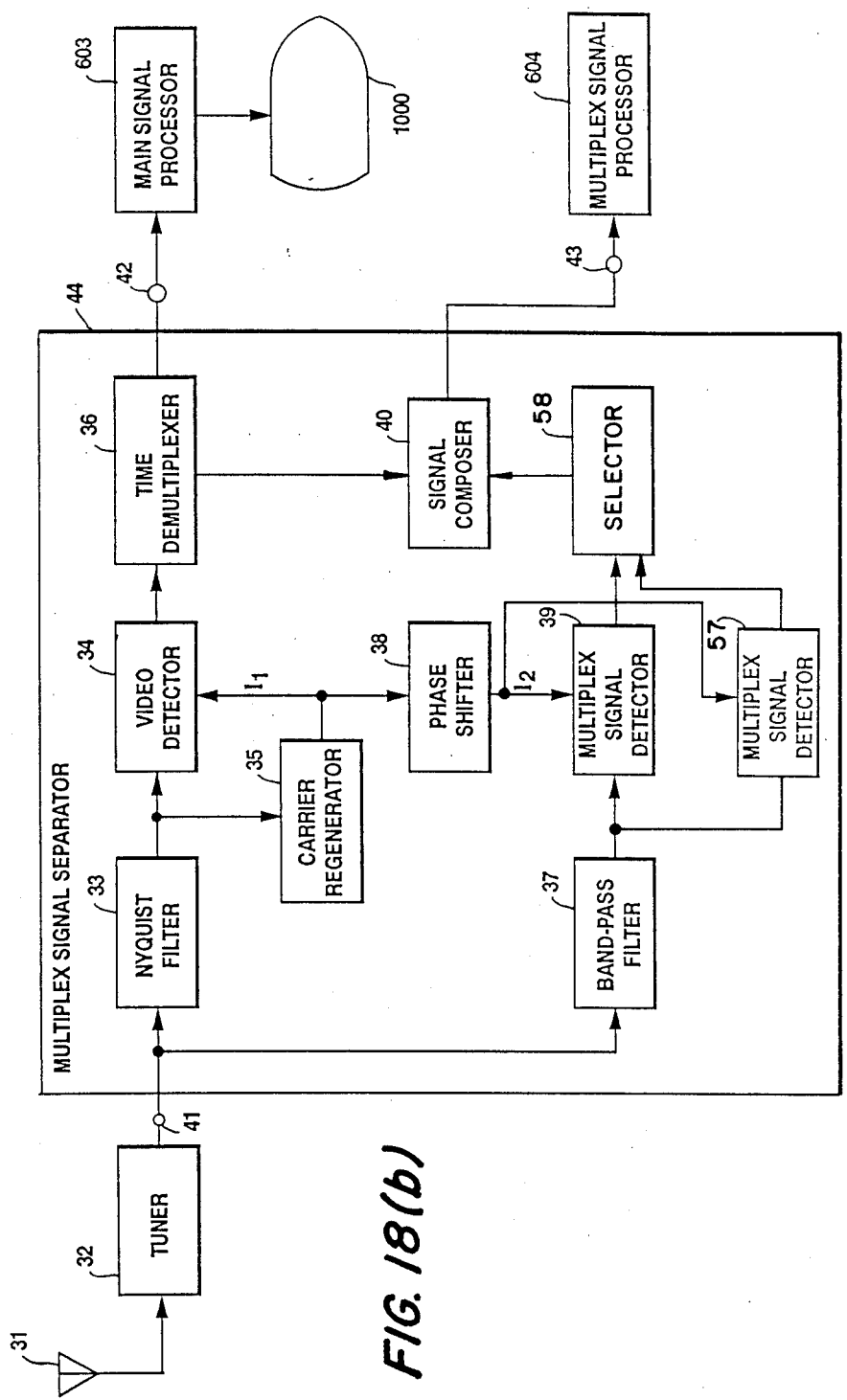

FIG. 18(b) shows a block diagram of a multiplex signal processor at the reception side for receiving the multiplex signal generated by the processor such as the one shown in FIG. 18(a). This figure shows another version of the multiplex signal separator 44 which includes an alternative detector. By detecting the amplitude-modulated signal as a positive modulation or a negative modulation alternatively, the multiplex signal is successfully demodulated. The modulated signal from the band-pass filter 37 is fed to both of a multiplex signal detector 39 and a multiplex signal detector 57 and detected.

The generated carrier I2 is fed to both of the two multiplex signal detectors 39, 57. The detected multilex signals, one of which is positive and another is negative, are fed to a selector 58 and selected according to the defined sequence. This sequence is either to be transmitted as a control signal or to be generated within the reception side.

From the selector 58, the original multiplex signal is outputed and processed as mentioned before.

When the multiplex signal has no DC component, negative and positive modulations are performed by changing the polarity of the original multiplex signal. Changing the polarity of the multiplex signal and changing the polarity of the carrier is understood to be equivalent.

What is claimed is:

1. A signal processing apparatus in a television signal transmitting system, comprising:
   a main signal generating means for generating a television signal as a main signal;
   a multiplex signal generating means for generating a multiplex signal;
   a signal separating means for separating the multiplex signal into first and second multiplex signals;
   a time-multiplexing means for time-multiplexing said second multiplex signal and said main signal to obtain a time-multiplexed main signal;
   a carrier generating means for generating a first carrier;
   a first amplitude-modulating means for amplitude-modulating said carrier by said time-multiplexed main signal to obtain a first vestigial side band, amplitude-modulated signal;
   a phase shifting means for shifting the phase of said first carrier by 90 degrees to obtain second carrier;
   a second amplitude-modulating means for amplitude-modulating said second carrier by said first multiplex signal to obtain a double side band, amplitude-modulated signal;
   an inverse Nyquist filter having a Nyquist characteristic for filtering said double side band, amplitude-modulated signal to obtain a second vestigial side band, amplitude-modulated signal;
   an adding means for adding said first and second vestigial side band, amplitude-modulated signals to obtain a resultant multiplexed signal; and
   a transmitting means for transmitting said resultant multiplexed signal.

2. An apparatus according to claim 1, wherein said second amplitude-modulating means has a means for removing said second carrier from said double side band, amplitude-modulated signal in periods corresponding to blanking intervals of said television signal.

3. An apparatus according to claim 1, further comprising a means for generating a discriminating signal for signal identification, and a means for superposing said discriminating signal in a vertical blanking interval of said first multiplex signal.

4. A signal processing apparatus in a television signal receiving system for receiving a multiplexed signal containing a television signal as a main signal and a multiplex signal separated into a first multiplex signal and a second multiplex signal, wherein said main signal is time-multiplexed with said second multiplex signal to form a time-multiplexed main signal which amplitude-modulates a first carrier to form a first signal, and wherein said first multiplex signal amplitude-modulates a second carrier having the same frequency as said first carrier and being different in phase by 90 degrees from said first carrier and is then passed through an inverse Nyquist filter to form a second signal, said first and second signals being added to each other to form said multiplexed signal, said apparatus comprising:

a Nyquist filter for filtering said multiplexed signal;

a filtering means for filtering said multiplexed signal in order to eliminate crosstalk distortion of said multiplex signal by said main signal;

a carrier regenerating means for regenerating said first carrier from said multiplexed signal;

a first signal detecting means for detecting said first signal from said multiplexed signal passed through said Nyquist filter by synchronous detection using said regenerating first carrier;

a phase shifting means for shifting the phase of said regenerated first carrier by 90 degrees to obtain said second carrier;

a first multiplex signal detecting means for detecting said first multiplex signal from said multiplexed signal passed through said filtering means by synchronous detection using said second carrier from said phase shifting means; and a time-demultiplexing means for time-demultiplexing said first signal into said main signal and said second multiplex signal;

a signal composing means for composing said second multiplex signal and said first multiplex signal to obtain said multiplex signal.

5. An apparatus according to claim 4, wherein said multiplexed signal to be received by said apparatus contains a discriminating signal for identifying said multiplex signal in a vertical blanking interval, and wherein said apparatus further comprises a means for extracting said discriminating signal, a selecting means for selecting the main and multiplex signal, and a means for controlling said selecting means according to said discriminating signal.

6. A multiplex signal processing apparatus in a television signal transmitting and receiving system, comprising at a transmitting side:

a main signal generating means for generating a television signal as a main signal;

a multiplex signal generating means for generating a multiplex signal;

a signal separating means for separating the multiplex signal into a first multiplex signal and a second multiplex signal;

a time-multiplexing means for time-multiplexing said second multiplex signal and said main signal to obtain a time-multiplexed main signal;

a carrier generating means for generating a first carrier;

a first amplitude-modulating means for amplitude-modulating said carrier by said time-multiplexed main signal to obtain a first vestigial side band, amplitude-modulated signal;

a phase shifting means for shifting the phase of said first carrier by 90 degrees to obtain a second carrier;

a second amplitude-modulating means for amplitude-modulating said second carrier by said first multiplex signal to obtain a double side band, amplitude-modulated signal;

an inverse Nyquist filter having a Nyquist characteristic for filtering said double side band, amplitude-modulated signal to obtain a second vestigial side band, amplitude-modulated signal;

an adding means for adding said first and second vestigial side band, amplitude-modulated signals to obtain a multiplexed signal; and a transmitting means for transmitting said multiplexed signal, and at a receiving side:

a Nyquist filter for filtering a received multiplexed signal;

a filtering means for filtering said received multiplexed signal to eliminate crosstalk distortion of said multiplex signal by said main signal;

a carrier regenerating means for regenerating said first carrier from said received multiplexed signal;

a main signal detecting means for detecting said time-multiplexed main signal from said multiplexed signal passed through said Nyquist filter by synchronous detection using said regenerated first carrier;

a phase shifting means for shifting the phase of said regenerated first carrier by 90 degrees to obtain said second carrier;

a first multiplex signal detecting means for detecting said first multiplex signal from said multiplexed signal passed through said filtering means by synchronous detection using said second carrier from said phase shifting means;

a time-demultiplexing means for time-demultiplexing said time-multiplexed main signal into said main signal and said second multiplex signal; and a signal composing means for composing said second multiplex signal and said first multiplex signal to obtain said multiplex signal.

7. An apparatus according to claim 6, wherein frequency characteristics of said inverse Nyquist filter and said Nyquist filter are substantially symmetrical to each other with respect to the frequency of said first carrier.

8. An apparatus according to claim 6, further comprising, at the transmitting side, a means for generating a discriminating signal for identifying said multiplex signal, and a means for superposing said discriminating signal in a vertical blanking interval of said multiplex signal, and, at the receiving side, a means for extracting said discriminating signal from the received multiplexed signal, a selection means for selecting said main and multiplex signals, and a means for controlling said selection means according to the extracted discriminating signal.

9. An apparatus for transmitting a wide aspect ratio television signal corresponding to an image displayed on a television screen having a wider aspect ratio than 4:3, comprising:

a first time-axis expanding means for expanding on a time-axis a first part of said wide aspect ratio television signal corresponding to the aspect ratio of 4:3 to obtain a first television signal;

a second time-axis expanding means for expanding parts other than the first part of said wide aspect ratio television signal to obtain a second television signal;

a carrier generating means for generating first and second carriers which are equal in frequency and which differ in phase by 90 degrees from each other;

a signal separating means for separating said second television signal into first and second multiplex television signals;

a scrambling means for scrambling said second multiplex television signal;

a time-multiplexing means for time-multiplexing said first television signal and said second multiplex television signal to obtain a main television signal;

a first amplitude-modulating means for amplitude-modulating said first carrier by said main television signal to obtain a first vestigial side band, amplitude-modulated television signal;

a second amplitude-modulating means for amplitude-modulating said second carrier by said first multiplex television signal to obtain a double side band, amplitude-modulated television signal;

an inverse Nyquist filter having a Nyquist characteristic for filtering said double side band, amplitude-modulated television signal to obtain a second vestigial side band, amplitude-modulated television signal;

an adding means for adding said first and second vestigial side band, amplitude-modulated television signals to obtain a multiplexed television signal; and a means for transmitting said multiplexed television signal.

10. An apparatus according to claim 9, wherein said scrambling means comprises:

a signal buffering means for exchanging line by line of said second multiplex television signal;

a timing generator for controlling said buffering means; and a superposing means for superposing on the scrambled signal a control signal for descrambling at the reception side.

11. An apparatus according to claim 9, wherein said scrambling means comprises:

a signal buffering means for exchanging left half and right half lines of said second multiplex television signal;

a timing generator for controlling said buffering means; and a superposing means for superposing on the scrambled signal a control signal for descrambling at the reception side.

12. An apparatus according to claim 9, wherein said scrambling means comprises:

a signal buffering means for exchanging polarity of said multiplex television signal line by line;

a timing generator for controlling said buffering means; and a superposing means for superposing on the scrambled signal a control signal for descrambling at the reception side.

13. An apparatus for receiving the multiplexed television signal transmitted from the apparatus as claimed in claim 9, comprising:

a means for receiving said multiplexed television signal;

a Nyquist filter for filtering said received multiplexed television signal;

a filtering means for filtering said multiplexed television signal passed through said Nyquist filter to eliminate crosstalk distortion of said second television signal by said first television signal;

a carrier regenerating means for regenerating first and second carriers from said multiplexed television signal which are equal in frequency and which differ in phase by 90 degrees from each other;

a first detecting means for detecting said main television signal from said multiplexed television signal passed through said Nyquist filter by using said regenerated first carrier;

a second detecting means for detecting said first multiplex television signal from said multiplexed television signal passed through said filtering means by using said regenerated second carrier;

a time-demultiplexing means for time-demultiplexing the main television signal into said first television signal and said second multiplex television signal;

a descrambling means for descrambling said second multiplex television signal;

a signal composing means for composing said first multiplex television signal and said second multiplex television signal to obtain said second television signal; and a means for composing said wide aspect ratio television signal from said first television signal and said second television signal.

14. An apparatus for transmitting a wide aspect ratio television signal corresponding to an image displayed on a television screen having a wider aspect ratio than 4:3, comprising:

a first time-axis expanding means for expanding on time-axis a first part of said wide aspect ratio television signal corresponding to the aspect ratio of 4:3 to obtain a first television signal;

a second time-axis expanding means for expanding parts other than the first part of said wide aspect ratio television signal to obtain a second television signal;

a carrier generating means for generating first and second carriers which are equal in frequency and which differ in phase by 90 degrees from each other;

a signal separating means for separating said second television signal into first and second multiplex television signals;

a time-multiplexing means for time-multiplexing said first television signal and said second multiplex television signal to obtain a main television signal;

a first amplitude-modulating means for amplitude-modulating said first carrier by said main television signal to obtain a first vestigial side band, amplitude-modulated television signal;

a second amplitude-modulating means for amplitude-modulating said second carrier by said first multiplex television signal to obtain a first double side band, amplitude-modulated television signal;

a third amplitude-modulating means for amplitude-modulating said second carrier by said first multiplex television signal to obtain a second double side band, amplitude-modulated television signal;

a signal selecting means for selecting said first double side band, amplitude-modulated television signal and said second double side band, amplitude-modulated television signal to obtain a double side band signal;

an inverse Nyquist filter having a Nyquist characteristic for filtering said double side band signal to obtain a second vestigial side band, amplitude-modulated television signal; and an adding means for adding said first and second vestigial side band, amplitude-modulated television signals to obtain a multiplexed television signal; and a means for transmitting said multiplexed television signal.

15. An apparatus for receiving the multiplexed television signal transmitted from the apparatus as claimed in claim 14, comprising:

a means for receiving said multiplexed television signal;

a Nyquist filter for filtering said received multiplexed television signal;

a filtering means for filtering said multiplexed television signal passed through said Nyquist filter to eliminate distortion of said second televisions signal by said first television signal;

a carrier regenerating means for regenerating first and second carriers from said multiplexed television signal which are equal in frequency and which differ in phase by 90 degrees from each other;

a first detecting means for detecting said main television signal from said multiplexed television signal passed through said Nyquist filter by using said regenerated first carrier;

a second detecting means for detecting from said multiplexed television signal passed through said filter means said first multiplex television signal modulated by said second amplitude-modulating means by using said regenerated second carrier;

a third detecting means for detecting from said multiplexed television signal passed through said filtering means said first multiplex television signal modulated by said third amplitude-modulating means by using said regenerated second carrier;

a signal selecting means for selecting said first multiplex television signal from outputs of said second and third detecting means;

a time-demultiplexing means for time-demultiplexing said main television signal into said first television signal and said second multiplex television signal;

a signal composing means for composing said first multiplex television signal and said second multiplex television signal to obtain said second television signal; and a means for composing said wide aspect ratio television signal from said first television signal and said second television signal.

16. An apparatus for transmitting a wide aspect ratio television signal corresponding to an image displayed on a television screen having a wider aspect ratio than 4:3, comprising:

a first time-axis expanding means for expanding in time-axis a first part of said wide aspect ratio television signal corresponding to the aspect ratio of 4:3 to obtain a first television signal;

a second time-axis expanding means for expanding a second part, consisting of parts other than the first part, of said wide aspect ratio television signal to obtain a second television signal;

a multiplexing means for multiplexing said first and second television signals in a frequency domain to obtain a multiplexed television signal; and a means for transmitting said multiplexed television signal;

wherein said multiplexing means comprises:

a carrier generating means for generating first and second carriers which are equal in frequency and which differ in phase by 90 degrees from each other;

a signal separating means for separating said second television signal into first and second multiplex television signals;

a time-multiplexing means for time-multiplexing said first television signal and said second multiplex signal to obtain a main television signal;

a first amplitude-modulating means for amplitude-modulating said first carrier by said main television signal to obtain a first vestigial side band, amplitidue-modulated television signal;

a second amplitude-modulating means for amplitude-modulating said second carrier by said first multiplex television signal to obtain a double side band, amplitude-modulated television signal;

an inverse Nyquist filter having a Nyquist characteristic for filtering said double side band, amplitude-modulated television signal to obtain a second vestigial side band, amplitude-modulated television signal; and an adding means for adding said first and second vestigial side band, amplitude-modulated television signals to obtain said multiplexed television signal.

17. A television apparatus for transmitting and receiving a wide aspect ratio television signal, said apparatus including:

an apparatus for transmitting a wide aspect ratio television signal corresponding to an image displayed on a television screen having a wider aspect ratio than 4:3, comprising:

a first time-axis expanding means for expanding in time-axis a first part of said wide aspect ratio television signal corresponding to the aspect ratio of 4:3 to obtain a first television signal;

a second time-axis expanding means for expanding a second part, consisting of parts other than the first part, of said wide aspect ratio television signal to obtain a second television signal;

a multiplexiing means for multiplexing said first and second television signals in a frequency domain to obtain a multiplexed television signal; and a means for transmitting said multiplexed television signal;

and further including an apparatus for receiving the multiplexed television signal transmitted from the apparatus comprising:

a means for receiving said multiplexed television signal;

a signal separating means for separating the received multiplexed television signal into said first and second television signals;

a first time-axis compressing means for compressing on a time-axis said first television signal to obtain said first part of said wide aspect ratio television signal;

a second time-axis compressing means for compressing on a time-axis said second television signal to obtain said second part of said wide aspect ratio television signal; and a means for composing said wide aspect ratio television signal from the first and second parts;

wherein said signal separating means comprises:

a Nyquist filter for filtering said received multiplexed television signal;

a filtering means for filtering said multiplexed television signal passed through said Nyquist filter to eliminate crosstalk distortion of said second television signal by said first television signal;
a carrier regenerating means for regenerating first and second carriers from said received multiplexed television signal which are equal in frequency and which differ in phase by 90 degrees from each other;
a first detecting means for detecting said main television signal from said multiplexed television signal passed through said Nyquist filter by using said regenerated first carrier;
a second detecting means for detecting said first multiplex television signal from said multiplexed television signal passed through said filtering means by using said regenerated second carrier;
a time-demultiplexing means for time-demultiplexing the main television signal into said first television signal and said second multiplex television signal;
a signal composing means for composing said first multiplex signal and said second multiplex television signal to obtain said second television signal.

* * * * *